Patented Feb. 22, 1944

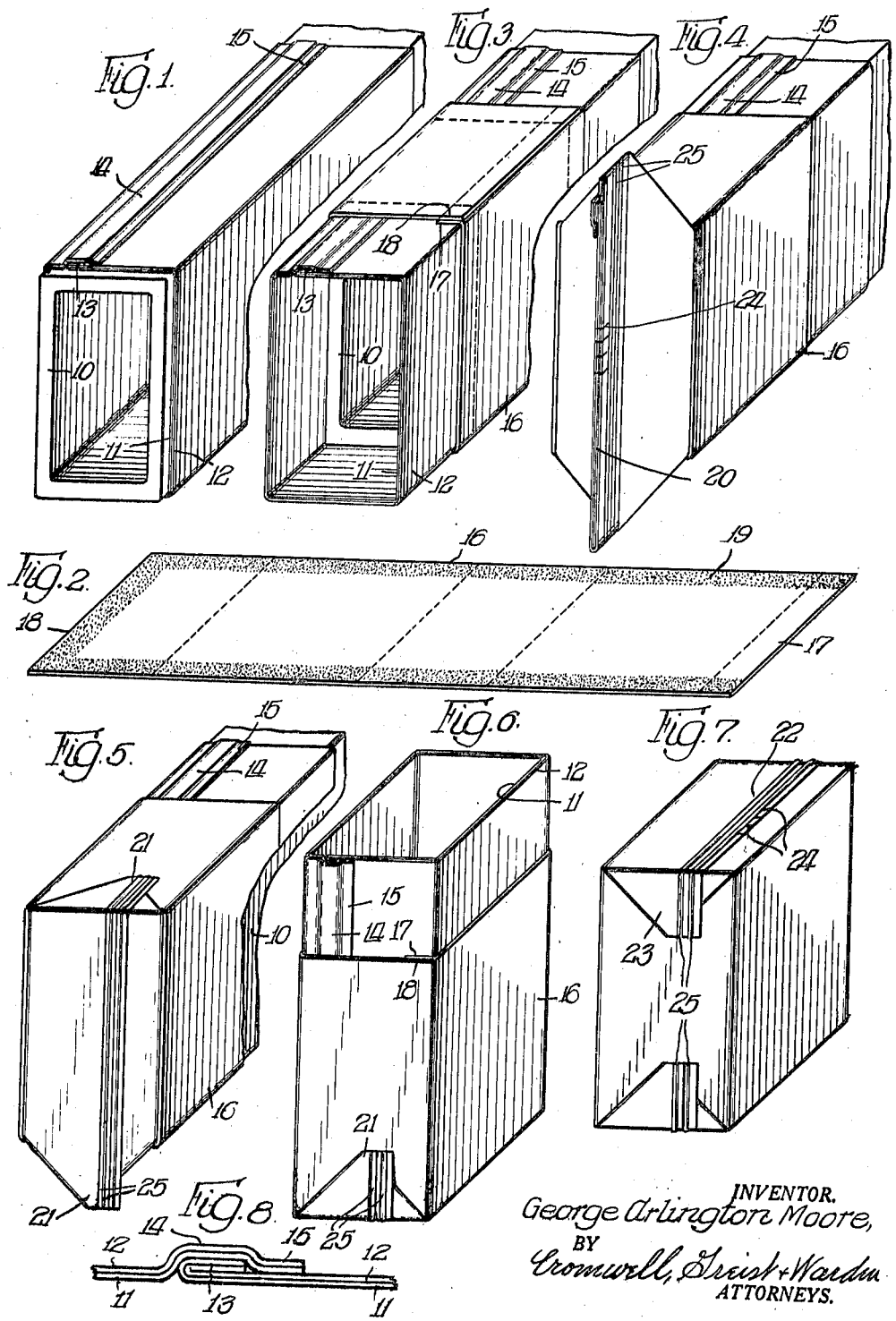

2,342,158

UNITED STATES PATENT OFFICE 2,342,158

CONTAINER AND METHOD OF MANUFACTURE

George Arlington Moore, New York, N. Y., assignor to Shellmar Products Company, Mount Vernon, Ohio, a corporation of Delaware Application January 7, 1941, Serial No. 373,457

8 Claims. (Cl. 229—3.5)

The present invention relates to an improved type of container, and has as a principal object the provision of a hermetically sealed container formed from flexible moisture-resistant materials sealed together to provide hermetic closures and having an exterior reinforcing sleeve cooperating with the flexible materials for securing the package in a definite shape.

Another object of the invention is to provide a container having a flexible inner carrying portion composed of paper and transparent rubber hydrochloride and an outer protective and relatively rigid member produced from paper board or the like, extensions on the inner member being sealed together and folded over into interlocking engagement with the outer protective member.

Still another object of the invention is to produce a container by laminating thermoplastic rubber hydrochloride or similar material to a protective sheet of paper or the like, forming the laminated sheet into tubular shape, encompassing the tube by a relatively rigid, shape-retaining, outer protective sleeve formed from paper board or the like, sealing one end of the inner tube which extends beyond the outer protective member to provide an end closure, folding extensions of the sealed end member over adjacent the sides of the shape-retaining member in interlocking relation, filling the container, and closing opposite end extensions in a similar manner.

Among other objects of the invention is to provide a container adapted to be filled with its intended contents without depending upon holders or supporting tools.

Still another object is to produce a container that is fully flexible in hermetic seam structures, yet economically reinforced to form a rigid container.

These and other objects will be evident upon a consideration of the following description of a preferred embodiment of the invention and by reference to the accompanying drawing, in which Fig. 1 is a fragmentary perspective view showing the formation of a tube about a hollow mandrel;

Fig. 2 is a perspective view of a paper board blank to be secured about the tube shown in Fig. 1;

Fig. 3 is a fragmentary view showing the partial displacement of the tube from the mandrel and the securement thereabout of the paper board supporting member;

Fig. 4 is a perspective view showing the formation of an initial end closure from the extension of the tube shown in Fig. 3;

Fig. 5 is a fragmentary perspective view showing the interlocking fold of the end closure member with respect to the paper board reinforcing member;

Fig. 6 is a perspective view of the container shown in Fig. 5 with the end closure complete and with the mandrel removed;

Fig. 7 is a perspective view showing the completedly package after formation of the second end closure and folding of this end closure into interlocking relation with respect to the paper board reinforcing member; and Fig. 8 is an enlarged end view of the longitudinal seam shown in Fig. 1.

Various different types of containers have been suggested within recent years as adaptations of laminated transparent rubber hydrochloride and paper. Transparent rubber hydrochloride, one embodiment of which is known to the trade as "Pliofilm," is highly moisture-resistant and when laminated to paper can be formed into bags and containers of different types to considerable advantage. A container of the laminated material is particularly desirable where a hermetically sealed package is required. Considerable difficulty has been encountered, however, in the packaging of certain materials which tend to cause package distortion.

In accordance with the present invention a rigid, hermetically sealed package is produced without the necessity of relying upon separate and expensive cartons and the like.

An initial step in the formation of the package consists of laminating a sheet of transparent rubber hydrochloride or the like to a reinforcing sheet such as paper. The technique for this lamination is well known and requires no further present discussion. After the lamination, preferably with a plastic laminating medium, the composite sheet is formed about a hollow mandrel indicated at 10 in Fig. 1, in such a manner that the rubber hydrochloride portion 11 of the sheet constitutes the inner layer of the resulting tube and the paper sheet 12 constitutes the outer protective layer of the sheet. The sheet is formed into a tube about the mandrel 10 by folding over an end edge section 13 to expose a Pliofilm exterior. The opposite edge 14 of the composite sheet then is formed over the turned-over edge 13 in the manner shown in Fig. 1 to provide a Pliofilm-to-Pliofilm contact and also to provide an end extension 15 which contacts the paper outer sheet 12. The overlapped seam portions then are sealed into a composite seam by the use of heat and pressure. In this seam contacting portions of the Pliofilm are coalesced and the end extension 15 is sealed to the paper exterior of the tube.

The next step in the formation of the container consists in partially displacing the resulting tube from the mandrel 10 in the manner shown in Fig. 3, thereby forming an end extension which subsequently is used to provide a closure portion for the container.

After partial displacement of the tube from the mandrel the paper board reinforcing sleeve 16 shown in Fig. 2 is folded about the mandrel and partially overlapped at the end sections 17 and 18. Before placing the reinforcing sleeve about the mandrel in the manner described, it is provided with adhesive lines 19 extending about three sides. After being folds about the tube in the manner shown in Fig. 3 the reinforcing member 16 is sealed at the overlapping end portions 17 and 18 and the adhesive lines 19 also secure the reinforcing sleeve to the outer paper sheet of the tube to prevent accidental displacement of the reinforcing sleeve from the tube. It is preferred to employ a thermoplastic or hot melt adhesive in securing the reinforcing member to the tube, since this provides for rapid operation and prevents the board from springing away from the body portion as could occur with a water adhesive before drying.

The next step in the formation of the container consists in pressing the end extension of the tube together in the manner shown in Fig. 4 and heat-sealing this extension by the application of heat and pressure, thereby forming a hermetically sealed end closure and an outwardly extending flap portion 20.

Thereafter, the flap 20 is folded over against the end of the container, and the outwardly extending ears 21 are folded over adjacent the side of the reinforcing member as shown in Fig. 5 to provide an interlock between the tube and the reinforcing member. These ears 21 may be adhesively secured to the sides of the reinforcing member 16 to prevent their accidental displacement.

After completing the end closure in this manner the partially formed container is removed from the hollow mandrel, and then is ready for filling. The commodity to be packaged is introduced into the open end of the container and thereafter the upper end extension 22 is sealed beyond the reinforcing sleeve in the same manner as described with respect to the extension 20 and the ears 22 of the upper extension also are folded downwardly adjacent the side of the reinforcing member to provide an interlock between the top of the flexible container and the outer reinforcing member.

Many articles such as prunes are packaged while in a heated condition. Upon cooling, the air within the hermetically sealed package contracts, thereby tending to cause an inward distortion of the flexible container. The container which is described herein is of particular utility in the packaging of such articles, since the bottom and top of the flexible container are interlocked with the rigid reinforcing member and the contraction due to the cooling of the air within the package is taken up by the flexible side walls of the container within the reinforcing sleeve. That is, while the ends of the flexible container are held against displacement, the sides are not so held and are free to bulge inwardly to the extent necessary for establishing pressure equilibrium conditions within the container. Thus, although the container may have contracted, this contraction will not be objectionable at the ends of the package. The package retains its merchantable and attractive appearance, particularly where contrasting colors are employed on the end closures of the inner tube and the outer reinforcing sleeve.

Among the many advantages of this type of package is the possibility of utilizing any desired type of label on the exterior of the reinforcing member. This obviates the necessity of registering printed designs with cut-off portions of the inner tube, and permits of the use of a relatively cheap reinforcing member. That is, an exterior sheet of relatively high grade and suitably decorated paper may be laminated to the paper board to provide a package of excellent appearance. In many instances it will be preferred to print the desired design directly on the reinforcing member.

In the finished package shown in Fig. 7 the exterior lip of the folded-over seal portion 22 is shown to be nicked as at 24. The end closure 20 likewise is shown in Fig. 4 with the edge nicks 24. The purpose of these nicks is to provide for the ready opening of the end closures merely by tearing along the nicked lines. While Pliofilm is difficult to tear where the sheet does not have a starting nick of this type, the package readily may be opened where such a nick is provided in the edge of the seam.

The type of end closure may vary considerably. In the embodiment shown in the drawing, the end closures each are provided with the sealing beads 25, these bead portions having been found desirable in producing a permanently hermetic seal.

It will be recognized that many changes in the container and method may be made without departing from the scope of the invention as defined in the appended claims.

I claim:

1. A container of the type described, comprising a tubular portion composed of an inner sheet of transparent rubber hydrochloride and an outer sheet of paper, said tubular portion having a longitudinal seam formed by coalesced portions of said rubber hydrochloride to provide a hermetic seal, and a reinforcing sleeve secured to said tubular portion, said tube and sleeve constituting a unitary structure, an end extension of said tubular portion being hermetically sealed and folded over exteriorly in interlocking engagement with two panels only with said sleeve.

2. A container of the type described, comprising a laminated sheet of rubber hydrochloride and paper folded and sealed in the form of a tube, and a reinforcing sleeve secured to said tube, said tube and sleeve constituting a unitary structure, the opposite sides of each end of said tube being hermetically sealed together to form an end closure with a sealed extension, and the ends of said sealed extension being folded exteriorly and interlockingly against two panels only of the sides of said sleeve.

3. A container of the type described, comprising a tubular portion composed of an inner sheet of thermoplastic rubber hydrochloride and an outer sheet of paper, said tubular portion having a longitudinal seam including coalesced portions of said thermoplastic rubber hydrochloride providing a hermetic seal, and an open-ended reinforcing sleeve secured to said tubular portion, an end extension of said tubular portion being hermetically sealed and folded over and outwardly against said sleeve in flattened interlocking condition against two panels only to provide an end closure.

4. A container of the type described, comprising a tubular portion composed of an inner sheet of thermoplastic rubber hydrochloride and an outer sheet of paper, said tubular portion having a longitudinal seam including coalesced portions of said thermoplastic rubber hydrochloride providing a hermetic seal, and an open-ended reinforcing sleeve secured to said tubular portion, restricted portions of said paper sheet being adhered to marginal portions only of said reinforcing member to provide for inward contraction of said tubular portion intermediate the ends of said sleeve, and an end extension of said tubular portion being hermetically sealed and outwardly folded over exteriorly against two end panels only in flattened condition to form an end closure.

5. A method of making a container of the class described which comprises the following steps: providing a web of material consisting of a sheet of transparent rubber hydrochloride and an outer sheet of paper and forming the same into a tubular formation with the rubber hydrochloride facing innermost; forming a longitudinal seam to complete the formation of a sealed tube by coalescing portions of said rubber hydrochloride to provide an hermetic seal; providing a reinforcing sleeve and encompassing said tube therewith around an intermediate portion of the latter, said sleeve being of less width than said tube and sealing overlapping portions of said sleeve, and hermetically sealing an end extension of said tube where it extends beyond said reinforcing sleeve by coalescing portions of the rubber hydrochloride and folding said extension portions over exteriorly of and downwardly alongside of said reinforcing sleeve into interlocking engagement therewith.

6. A method of making a container of the type described which comprises: providing a laminated sheet of rubber hydrochloride and reinforcing paper and folding and sealing the same in the form of a tube; providing a reinforcing sleeve of relatively rigid material and encompassing said tube therewith and sealing overlapping edges of said sleeve, said sleeve being of smaller dimension than the body of said tube so that said tube projects a substantial distance on either side of said sleeve beyond its edges; hermetically sealing the opposite side of each end of said tube together to form an end closure with sealed extensions extending beyond the walls of said container, and folding the ends of said sealed extensions exteriorly and interlockingly against the sides of said sleeve.

7. A method of providing a container of the type described which comprises: providing a sheet of thermoplastic rubber hydrochloride having an outer layer of paper and folding the same into a tubular formation; effecting a seal to hold said material in said formation with the rubber hydrochloride facing innermost; bringing free marginal edges of said material in rubber hydrochloride face-to-face relationship and coalescing said marginal portions to provide a longitudinal seam for said tube which is an hermetic seal; providing a blank of relatively rigid material having marginal lines of adhesive and encompassing the intermediate portions of said tube with said material to form a sleeve and sealing overlapping portions of said sleeve, said tubular portion extending beyond the ends a substantial distance away from said sleeve; hermetically sealing end extension of said tubular portion so that they extend outwardly beyond the walls of said sleeved formation, and folding said extended sealed portions downwardly against said sleeve in flattened interlocking condition to provide an end closure.

8. A method of making a container of the type described which comprises: providing a sheet of thermoplastic rubber hydrochloride material having an outer backing of paper and folding said sheet into tubular formation with the rubber hydrochloride facing innermost; bringing free marginal portions of said tubular formation in rubber hydrochloride face-to-face relationship and coalescing said marginal portions to provide an hermetic longitudinal seam to complete said tubular formation; encompassing said tubular formation in its intermediate area with an open ended reinforcing sleeve having marginal portions provided with an adhesive to adhere to said paper backing and to permit portions only of said reinforcing paper to contract inwardly, said reinforcing sleeve having overlapping portions provided with an adhesive; sealing said overlapping portions; and hermetically sealing the end extensions of said tubular formation where they extend beyond the edges of said sleeve to provide outwardly extending ears extending beyond the walls of said formation with said hermetic end closure seal being transverse of said longitudinal seam, and folding said ears downwardly and against the sides of said container and sealing the same to said sleeve walls to provide an interlock between said ears and said container body.

GEORGE ARLINGTON MOORE.